US005345159A

United States Patent [19]

Hanamura

[11] Patent Number: 5,345,159

[45] Date of Patent: Sep. 6, 1994

[54] METHOD OF CONTROLLING PRINTER

[75] Inventor: Makoto Hanamura, Nagano, Japan

[73] Assignee: Seiko Epson Corporation, Tokyo, Japan

[21] Appl. No.: 925,212

[22] Filed: Aug. 6, 1992

[30] Foreign Application Priority Data

Aug. 9, 1991 [JP] Japan .................................. 3-200799

[51] Int. Cl.[5] ................................................ G05B 5/00

[52] U.S. Cl. .................................... 318/447; 328/484; 328/921

[58] Field of Search ............... 318/696, 685, 445, 447, 318/449, 452, 461, 446, 478, 484; 388/921, 903, 809-824; 400/279, 578, 605, 624, 642

[56] References Cited

U.S. PATENT DOCUMENTS

| | | | |
|---|---|---|---|
| 4,270,868 | 6/1981 | Morgan et al. | 318/599 X |
| 4,698,566 | 10/1987 | Okamura | 318/434 |
| 4,701,685 | 10/1987 | Gruner | 388/912 |
| 4,739,230 | 4/1988 | Sonobe et al. | 318/138 X |
| 5,172,138 | 12/1992 | Okazawa et al. | 318/466 |

*Primary Examiner*—William M. Shoop, Jr.
*Assistant Examiner*—David Martin
*Attorney, Agent, or Firm*—Sughrue, Mion, Zinn, Macpeak & Seas

[57] ABSTRACT

A method of controlling a printer using a dc motor as a drive source thereof, comprises the steps of: setting a predetermined prohibition period of time during which print and sheet-forward operations are prohibited, the predetermined prohibition period of time corresponding to a period of time until the motor arrives at a predetermined speed since the motor starts to be energized; measuring a motor power turn-off period of time until the motor starts to be energized since the motor is turned off; comparing the motor power turn-off period of time with a predetermined value; if the motor power turn-off period of time is within the predetermined value, making the prohibition period of time invalid; and if the motor power turn-off period of time exceeds the predetermined value, making the prohibition period of time valid.

2 Claims, 6 Drawing Sheets

METHOD OF CONTROLLING PRINTER

BACKGROUND OF THE INVENTION

1. Field of the Invention

This invention relates to a method of controlling a printer using a dc motor as a drive source.

2. Prior Art

A conventional printer of this type employs a control method in which a time is set so that a stopped dc motor is started to reach a predetermined speed irrespective of the length of time the motor power was turned off after the motor power is turned on again to perform the print/sheet-forward (printing and sheet forwarding) operations for a succeeding line after the motor power was turned off upon the end of the print/sheet-forward operations for the last line. The print/sheet-forward operations for the succeeding line are started after such set time elapses.

FIG. 5 is a timing chart showing an operation method of an ordinary conventional printer. After a motor has been started by a motor drive signal 50, a timing signal 51 or the like is detected. Based on the detected timing signal, a printing operation 53 is performed at a predetermined position and sheet forwarding operation 54 is then performed. The print/sheet-forward operatings are repeated for a required number of lines. The motor drive signal 50 is then turned off to stop the dc motor.

A method of controlling the conventional printer will be described with reference to the flowchart shown in FIG. 8 and the timing chart shown in FIG. 9. In Step 11 the stopped dc motor is started by applying the motor drive signal 50, and in Step 12 a timer for regulating a start time A within which the motor reaches a predetermined speed E is started. After the start time A, as marked by a timer output signal 55, has elapsed in Step 13, the print/sheet-forward operations are performed in Step 14. When the print/sheet-forward operations have been completed in Step 14, it is judged in Step 15 whether the print/sheet-forward operations are to be stopped or to be continuously performed. If the print/-sheet-forward operations are to be continuously performed, the processing returns to Step 14. If the operation is to be stopped, the motor drive signal 50 is turned off to stop the dc motor in Step 16.

FIG. 7 shows a waveform of the motor current between the start and stop of the printer as shown in FIGS. 8 and 9. The vertical axis indicates a motor current I and the horizontal axis indicates a time T. A large current G flows when the motor is started since the motor has been stopped. As the motor is accelerated, the current G is gradually decreased. The current value increases during the print operation portion H and the sheet-forward operation portion J due to increases in mechanical loads, and the motor is shut off thereafter. If large loads at a print operation portion H and a sheet-forward operation portion J shown in FIG. 7 are applied to the dc motor before the dc motor reaches the predetermined speed, the motor cannot overcome the loads. As a result, the dc motor is stopped, and the printer is also stopped during the operation. To prevent such accidental stoppage of the printer, the print/sheet-forward operations are performed in Step 14 of FIG. 8 after the start time A, marked by the timer output signal 55 shown in FIG. 9, has elapsed.

FIG. 6 shows waveforms indicating motor speeds between the start and stop of the printer shown in FIGS. 8 and 9. The vertical axis indicates a motor speed V and the horizontal axis indicates a time T. Since the dc motor is shut off at a start portion D, the motor speed starts from zero. The motor speed is gradually increased, and reaches a predetermined value E after a start time A has elapsed. When the motor speed has reached the predetermined value E, the print/sheet-forward operations are performed, and thereafter the motor power is turned off. As a result, the motor is decelerated and stopped as shown by the solid line in portion F. The time required for the dc motor to come to a complete stop is usually several times the start time A, within which the dc motor reaches the predetermined speed E from zero, due to inertia in the rotor section of the dc motor. When the motor power is turned on again to perform the print/sheet-forward operations for a succeeding line during this stop operation F, the motor speed reaches the predetermined value E within a short period of time, as shown by the broken line in portion M, unless the motor speed V is zeroed.

However, the above-mentioned conventional printer has addressed the following shortcomings.

(1) When the motor power is turned on again to perform the print/sheet-forward operations for a succeeding line, even if the dc motor continues to rotate due to inertia in the rotor immediately after the motor power has been turned off upon completion of the last print/-sheet-forward operations, it is necessary to set a timer for a predetermined time within which the dc motor reaches a predetermined speed from the stopped state, thereby waiting for such predetermined time to expire before starting the print/sheet-forward operations for the succeeding line. Thus, as long as the time required for the print/sheet-forward operations are concerned, the speed for the intermittently-driven print/sheet-forward operations for single lines is slower than speed for the continuous print/sheet-forward operations.

(2) If the dc motor speed is increased to reduce the delay in the print/sheet-forward speed during the print/sheet-forward operations, the print/sheet-forward mechanism is subjected to large loads. As a result, increased cost due to increased power consumption and use of heavy-duty parts capable of accommodating high speed operations are encountered.

(3) To prepare print data and the like for a succeeding line within the print/sheet-forward time to allow continuous printing, an LSI chip including a high-speed processing CPU must be provided, which entails large costs also in designing control circuits.

SUMMARY OF THE INVENTION

The invention has been made to overcome the above shortcomings. Accordingly, an object of the invention is to provide a printer of low cost but high performance, which can minimize the reduction in the speed of the print/sheet-forward operations without using power-consuming and expensive parts as well as an expensive LSI chip or and the like.

To achieve the above object, the invention is applied to a method of controlling a printer. The printer is of a small type using a dc motor as a drive source and has a start time during which the print/sheet-forward operations are prohibited to allow the dc motor to reach a predetermined speed. The printer selects and prints/-sheet-forwards at a predetermined position when the dc motor has reached the predetermined speed.

The printer includes: a turn-off time measuring means for measuring a time for turning off the power of the motor from a last stop after the end of printing to a current start; and a comparing means for comparing a motor power turn-off time measured by the turn-off time measuring means with a predetermined time.

The method of controlling the printer involves the steps of removing the prohibiting of the print/sheet-forward operations while dispensing with the start time if the motor power turn-off time during which power of the dc motor is turned off is within a predetermined time, and setting the start time if the motor power turn-off time exceeds the predetermined time.

According to the above configuration of the invention, the printer can start the print/sheet-forward operations for a next line without ensuring a waiting time for the dc motor to start and reach a predetermined speed if the motor power turn-off time measured by a timer is found to be within a predetermined value when the motor power has been turned on again to perform the print/sheet-forward operations for the next line after the motor power was turned off upon end of the print/sheet-forward operations for the last line and the timer was started to measure the motor power turn-off time. Thus, neither is power consumption increased nor are expensive parts used with the printer of the invention, thus allowing the print/sheet-forward operations for a single line to be increased during the intermittent drive time in which the printer is stopped and started repetitively.

DETAILED DESCRIPTION OF THE PREFERRED EMBODIMENTS

Figure 1:
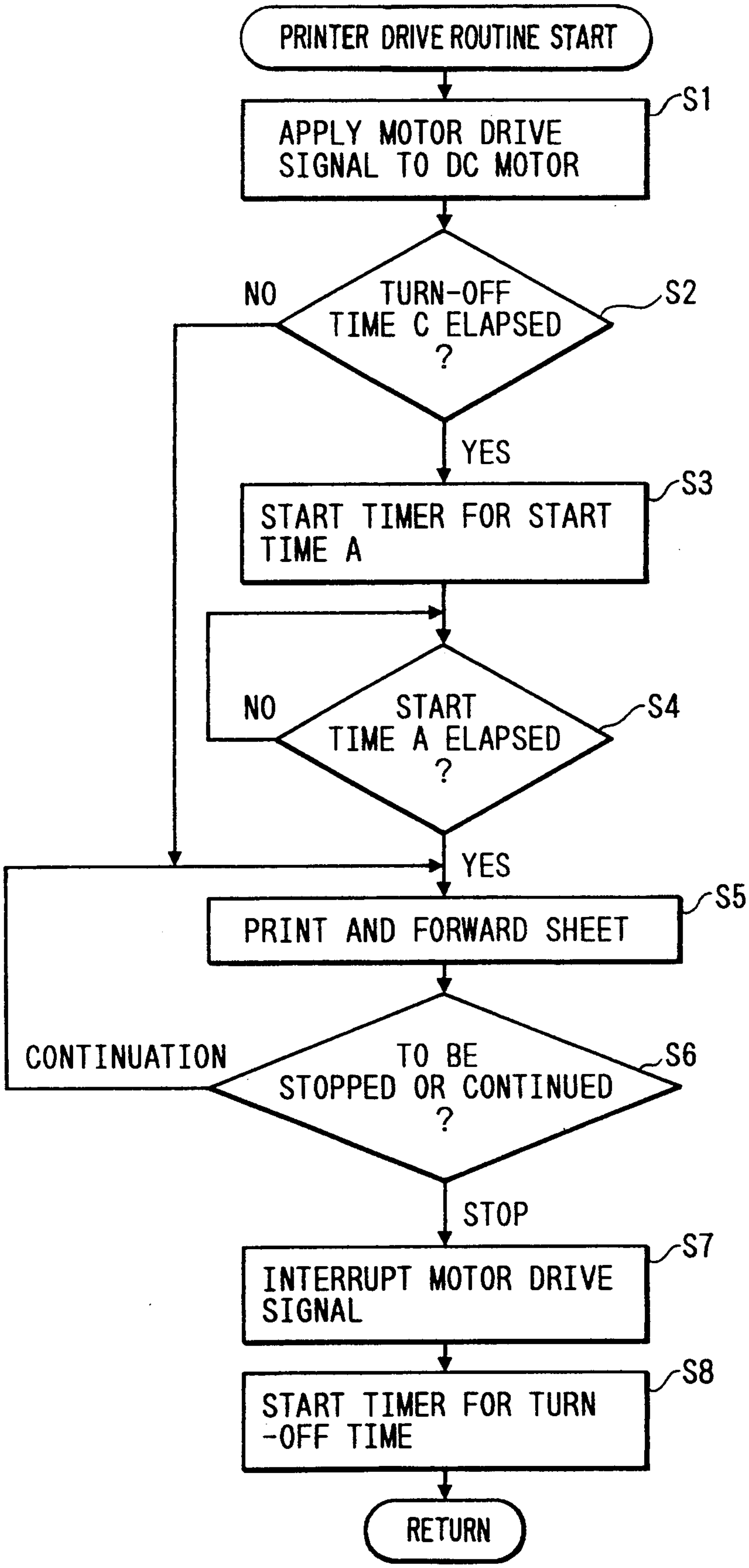
FIG. 1 is a flowchart showing a printing control method according to an embodiment of the invention.
Figure 2:
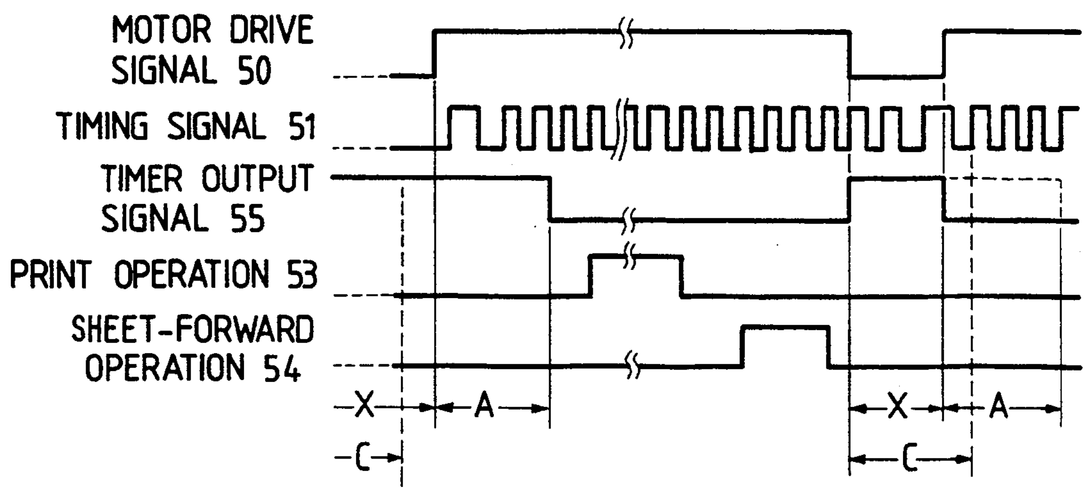
FIG. 2 is a timing chart showing the printing control method of FIG. 1.
Figure 3:
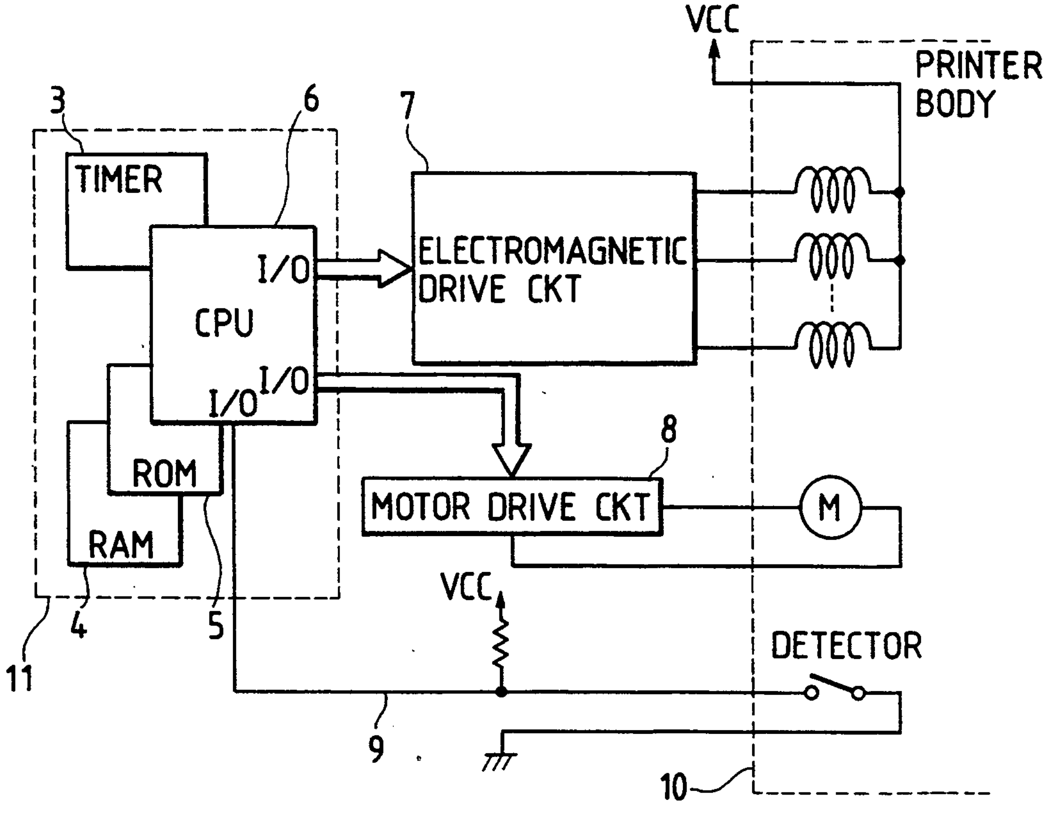
FIG. 3 is a block diagram showing a print construction used in an exemplary control method of the invention.
Figure 4:
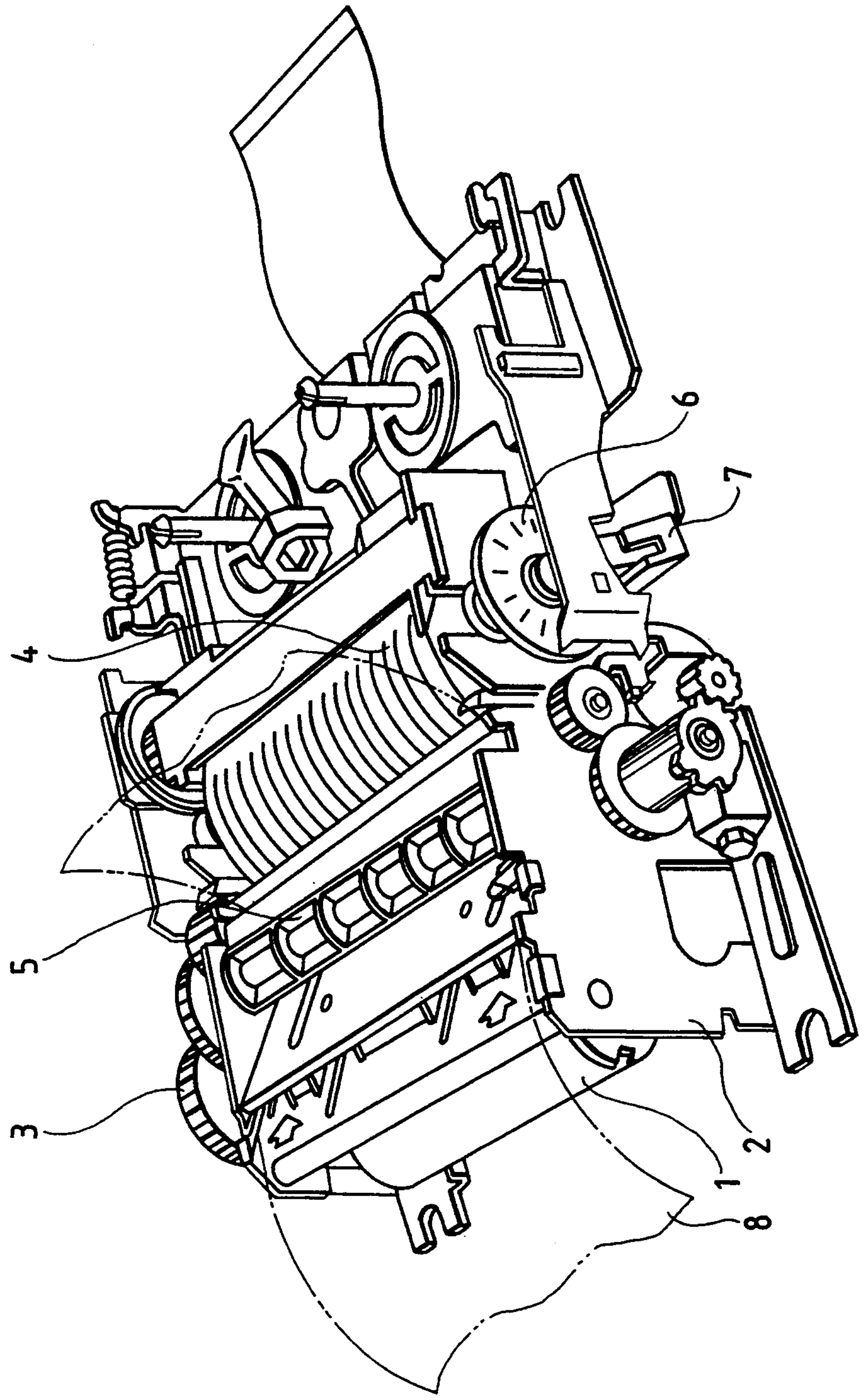
FIG. 4 is a schematic diagram showing a printer according to the invention.
Figure 5:
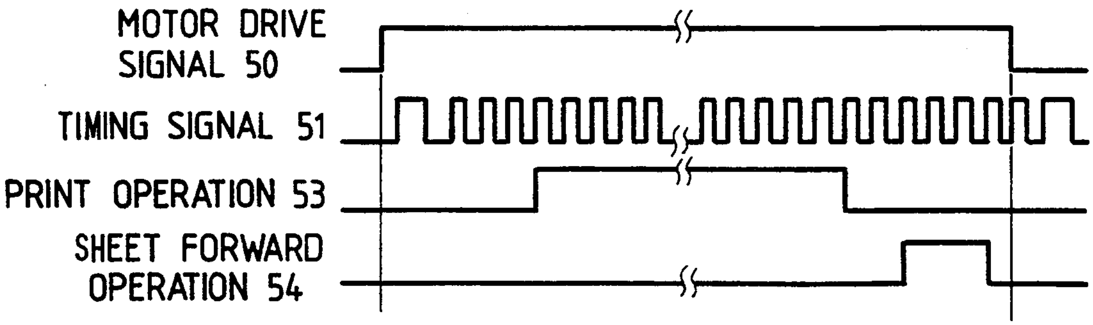
FIG. 5 is a timing chart showing a method of operating a conventional printer.

FIG. 1 is a flowchart showing a printing control method according to one embodiment of this invention; FIG. 2 is a timing chart thereof; FIG. 3 is a block diagram; and FIG. 4 is a perspective view of a printer used in this invention.

The main configuration of the printer will be described. In FIG. 4, a motor 1 serving as a source for driving the printer is secured to a frame 2. A type wheel 4, which is driven by the motor 1 selectively through a gear train 3 or the like, is rotatably supported by the frame 2. The type wheel 4 has character patterns formed on the circumferential surface thereof. A sheet forward means (not shown) includes a sheet forward roller and a sheet bias roller (not shown) that comes in pressure contact with the sheet forward roller. A detecting section has a detecting wheel 6 mounted so as to be coaxial with the type wheel 4. The detecting wheel 6 has a circuit pattern. The detecting section, e.g., detects timing signals with a leaf switch 7. Printing is done selectively at a predetermined position by biasing a recording sheet 8 onto the type wheel 4 using a print roller 5 having an eccentric shaft (not shown). The type wheel 4 is brought into pressure contact with an ink ribbon (not shown) serving as an inking means. These components are supported by the frame 2.

The start/stop control of the printer will be described next.

As shown in the flowchart of FIG. 1, at the time of starting the dc motor from its stopped state, a motor drive signal for starting the dc motor is applied in Step 1, and whether or not a timer output signal 55 measuring the time during which the motor drive signal has been turned off has been present for a time shorter than a turn-off time C is verified in Step 2. If the timer output signal 55 has been present for a time shorter than the turn-off time C, then the processing proceeds to Step 5 to control the print/sheet-forward operations. If the timer output signal 55 lasts has been present longer than the turn-ff time C, then a timer for regulating a start time A is started in Step 3, and a control operation in Step 4 is repeated until the start time A regulated by the timer output signal 55 elapses in Step 4. When the start time A has elapsed, the processing proceeds to the print/sheet-forward control in Step 5. Upon end of the print/sheet-forward control in Step 5, it is judged whether the printer is stopped or whether the print/sheet-forward operations are continued in Step 6. Print/sheet-forward data for a next line is prepared, and if the print/sheet-forward operations are performed continuously, the control in Step 5 is repeated. If it is in the course of preparing the print/sheet-forward data for the next line or the print/sheet-forward operations for only one line, the printer is stopped by turning off the power of the motor in Step 7. In Step 8 a timer for measuring a motor power turn-off time is started. The motor power turn-off time is regulated by the timer output signal 55 in this way, and if the motor power turn-off time is within the turn-off time C, then the print/sheet-forward operations are ready to be performed immediately after the turning on of the motor power, whereas if the motor power turn-off time exceeds the turn-off time C, then the print/sheet-forward operations are started after the start time A has elapsed. FIG. 2 shows a timing chart indicating that the timer-regulated time between the print/sheet-forward operations for a single line by applying the motor drive signal after the timer-measured turn-off time C has elapsed and that the operation of turning on again the motor power for the next line after the motor has been turned off is within the turn-off time C.

As shown in the timing chart of FIG. 2, a motor drive signal 50 for starting the dc motor is applied after print/sheet-forward data has been prepared, and it is checked thereafter whether a turn-off time X regulated by the timer output signal 55, which measured the motor power turn-off time while the motor drive signal 50 was turned off, is within a predetermined turn-off time C. Here, since the turn-off time X exceeds the predetermined turn-off time C, a timer for measuring the start time A is started, leaving a print operation 53 and a sheet-forward operation 54 undone until the start time A regulated by the timer output signal 55 elapses.

Upon elapse of the start time A, the processing proceeds to the print operation 53 and the sheet-forward operation 54. Upon completion of the print operation 53 and the sheet-forward operation 54, the motor drive signal 50 is turned off at a predetermined position regulated by a timing signal 51 to stop the printer. Immediately after the motor power has been turned off, the timer for measuring the motor power turn-off time is started, and at the same time, print/sheet-forward data for a next line is prepared. When the print/sheet-forward data has been prepared, the motor drive signal 50 is applied again. The motor power turn-off time is measured by the timer output signal 55, and if the turn-off time X for the next line is within the predetermined turn-off time C, then the print operation 53 and the sheet-forward operation 54 are ready to be performed immediately after the motor power has been turned on again, whereas if the turn-off time X exceeds the turn-off time C, then the print operation 53 and the sheet-forward operation 54 are started after the start time A shown by the broken line has elapsed. The measuring of the motor power turn-off time by the timer output signal 55 in this way allows the system to judge that the dc motor is started from the stopped state while intermittently driving the printer, or that the motor is started from the state in which the motor speed is not reduced immediately after the motor power has been turned off. If the motor power turn-off time is within the turn-off time C, the print/sheet forward operations are ready to be performed immediately after the motor power has been turned on, which then prevents a reduction in the printer speed for printing and sheet-forwarding a single line.

Figure 6:
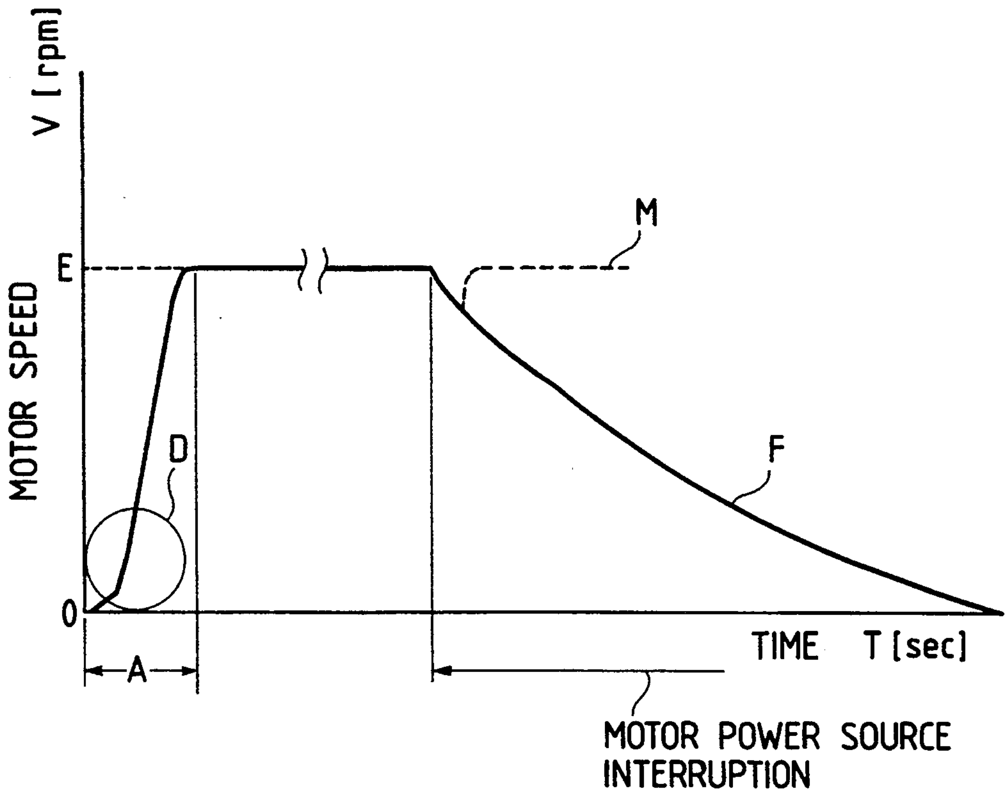
FIG. 6 is a diagram showing a waveform of a motor speed between start and stop of a motor.
Figure 7:
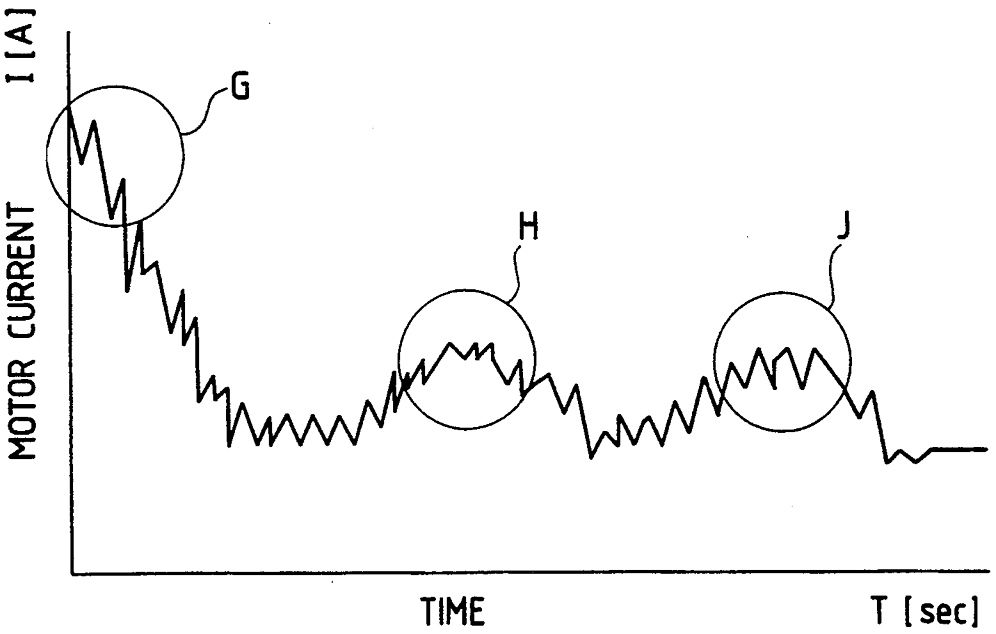
FIG. 7 is a diagram showing a waveform of current between start and stop of a motor.
Figure 9:
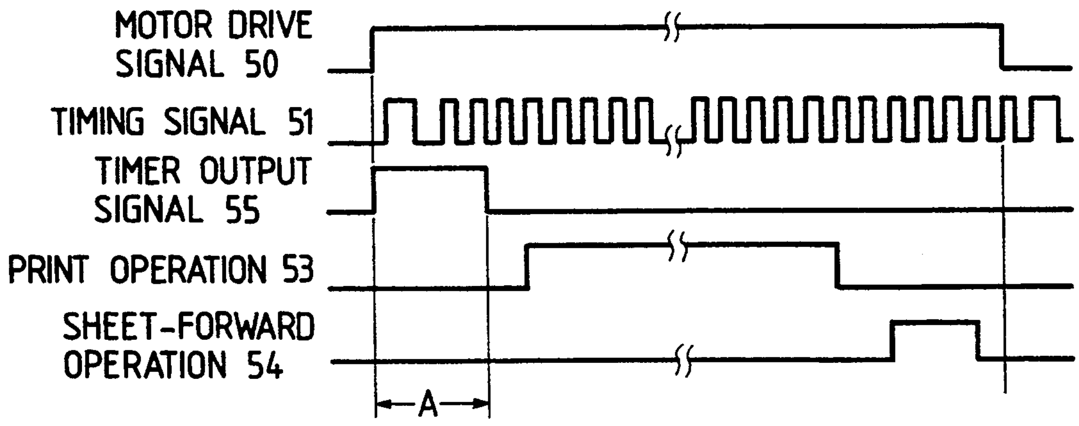
FIG. 9 PRIOR ART
FIG. 9 is a timing chart showing the conventional example.
Figure 8:
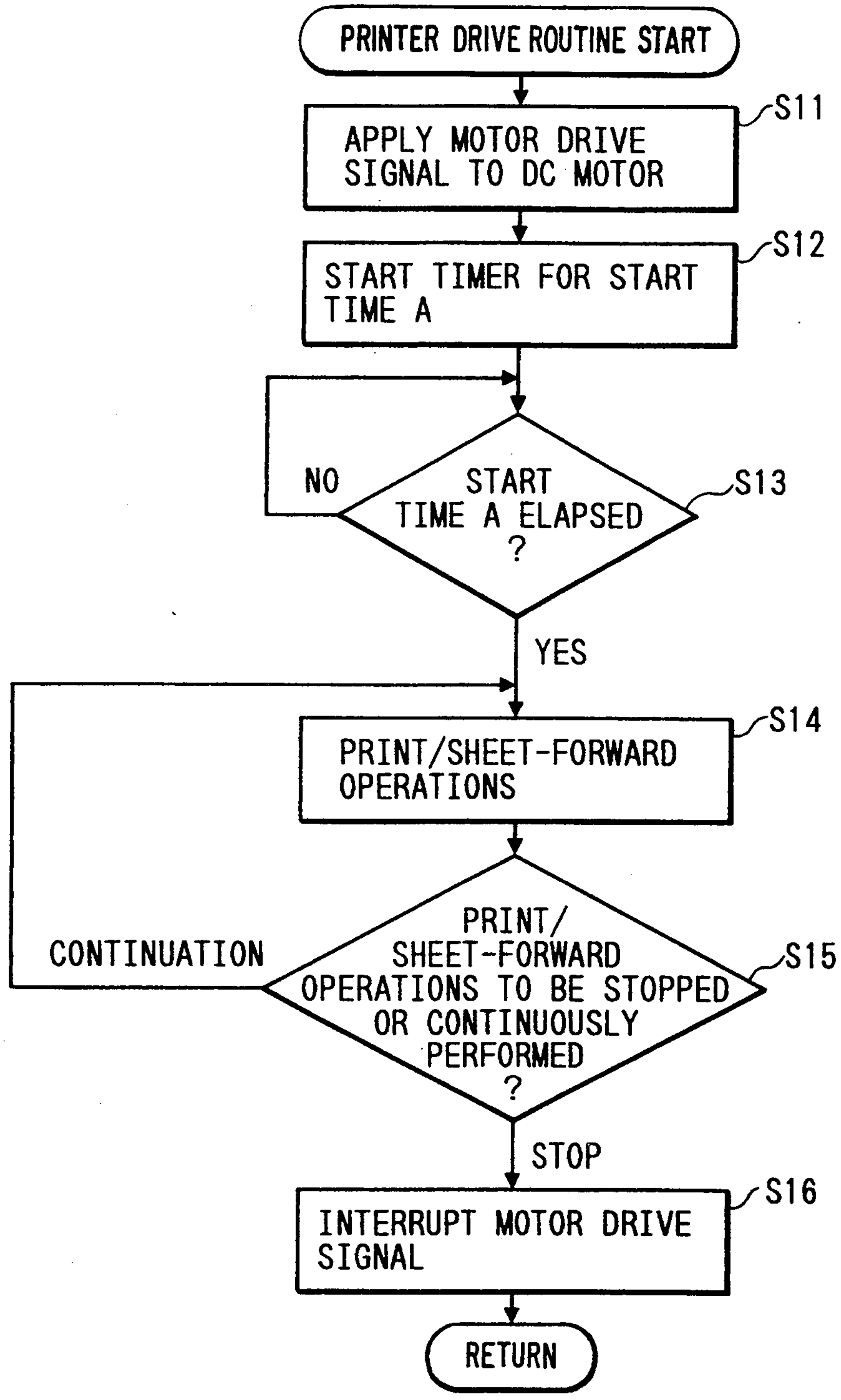
FIG. 8 is a flowchart showing a conventional example.

An exemplary control method of the invention will be described with reference to the block diagram shown in FIG. 3. A control section includes a timer 3 for measuring time, a RAM 4 for temporarily storing data being operated, on a CPU 6 for generally controlling programs, an electromagnetic drive circuit 7 for printing, sheet-forwarding, etc., a motor drive circuit 8 for driving a motor, and a detecting circuit 9 for detecting a timing signal or the like. A portion surrounded by the broken line on the right shows a printer body. A portion 11 surrounded by the broken line on the left shows a printer controlling LSI for controlling the drive of the printer and performing logic operations for printing and sheet-forwarding. Normal printer control involves the steps of preparing data for logic operations as well as for printing and sheet-forwarding based on data inputted from keys (not shown), and storing the prepared data in the RAM 4 before printing a next line. Since this data processing is completed within a short period of time while requiring neither print data nor logic operations as is the case with the sheet-forwarding operation, the sheet-forwarding operation for a next line can be performed without turning off the printer motor drive signal. The time required for performing logic operations and storing print data in the RAM 4 may not be completed by the arrival of a timing signal for the next line depending on the print conditions, thus driving causing the motor to be driven intermittently by turning off the motor drive signal as described above. However, as shown in FIG. 6, it is understood that the time during which the CPU 6 performs logic operations and the time during which the print data is stored in the RAM 4 are completed within a time period far shorter than the predetermined turn-off time C, compared with the stop operation F in which the motor power is turned off and the speed V of the motor is thereby reduced. Thus, when the printer is operated intermittently to prepare the print data for the next line, the motor power turn-off time X is measured and the measured time is compared with the predetermined turn-off time C as shown in FIG. 2. As a result, the printer can perform the print/sheet-forward operations without waiting for the start time A, thus preventing the printer speed from being reduced by the intermittent drive. Since the data for the next line is prepared within the print/sheet-forward time, the printer circuits can be designed inexpensively using no LSI containing a high-speed CPU.

As described above, the invention allows the printer to perform the print/sheet-forward operations for a next line while omitting the start time of the dc motor if the motor power turn-off time is found to be within a predetermined value when the motor power has been turned on again to perform the print/sheet-forward operations for the next line after the motor power was turned off upon end of the print/sheet-forward operations for the last line. Thus, the invention does not require a design such as would adversely affect the print/sheet-forward mechanisms by increasing the speed of the dc motor. In addition, the invention, involving no LSI having a high-speed CPU, can provide a printer of high cost performance with the lowest possible print/sheet-forward speed without using power-consuming and durable parts and expensive circuitry.

What is claimed is:

1. A method of controlling a printer using a dc motor as a drive source thereof, said method comprising the steps of:

setting a predetermined prohibition period of time during which print and sheet-forward operations are prohibited, said predetermined prohibition period of time corresponding to a period of time until said motor arrives at a predetermined speed after said motor is energized;

measuring a motor power turn-off period of time commencing when said motor is turned off and ending when said motor is again energized;

comparing said motor power turn-off period of time with a predetermined value;

if said motor power turn-off period of time is less than or equal to said predetermined value, immediately effecting said print and sheet-forward operations; and if said motor power turn-off period of time exceeds said predetermined value, inhibiting said print and sheet forward operation until said prohibition period of time has elapsed.

2. A printer for performing print and sheet-forward operations using a dc motor as drive source, said printer comprising:

means for setting a predetermined prohibition period of time during which print and sheet-forward operations are prohibited, said predetermined prohibition period of time corresponding to a period of time until said motor arrives at a predetermined speed after said motor is energized;

means for measuring a motor power turn-off period of time commencing when said motor is turned off and ending when said motor is again energized;

means for comparing said motor power turn-off period of time with a predtermined value; and means for immediately effecting said print and sheet-forward operations if said motor power turn-off period of time is less than or equal to said predetermined value, and inhibiting said print and sheet-formed operations until said prohibition period has elapsed if said motor power turn-off period of time exceeds said predetermined value.

* * * * *